March 28, 1967       D. M. NILES       3,311,196
DYNAMOELECTRIC MACHINE LUBRICATION SUPPLYING ARRANGEMENT
Filed March 2, 1964
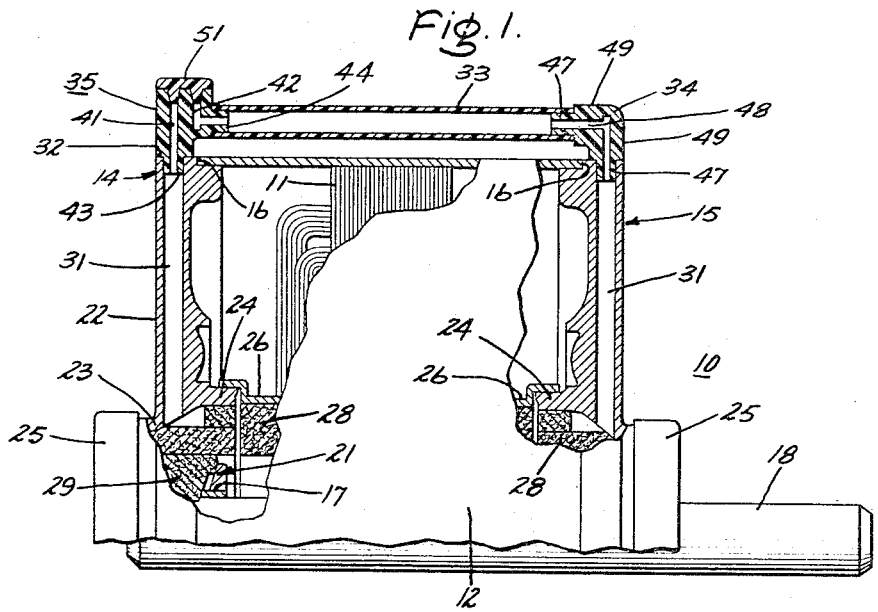
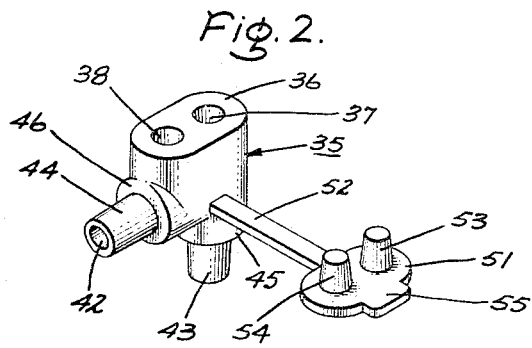
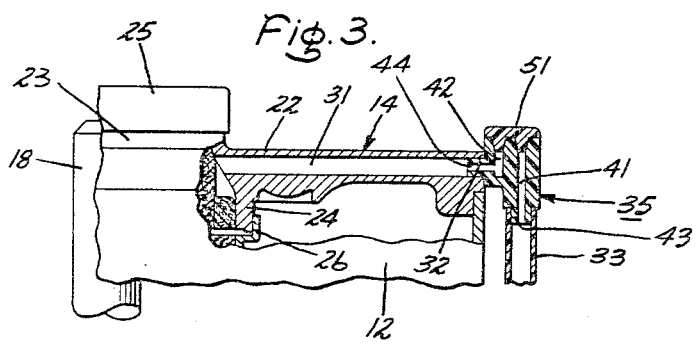
Inventor:
Donald M. Niles,
by John M. Stoudt
His Attorney.

United States Patent Office

3,311,196
Patented Mar. 28, 1967

3,311,196
DYNAMOELECTRIC MACHINE LUBRICATION SUPPLYING ARRANGEMENT
Donald M. Niles, Fort Wayne, Ind., assignor to General Electric Company, a corporation of New York
Filed Mar. 2, 1964, Ser. No. 348,670
6 Claims. (Cl. 184—65)

The present invention relates generally to an arrangement for adding lubricant to a dynamoelectric machine and more particularly to an improved and satisfactory arrangement for supplying lubricant to lubrication reservoirs located at either side of the machine regardless of the position in which it is mounted.

Dynamoelectric machines, such as small horsepower electric motors, normally include a housing having a pair of end frames each mounting a bearing to support a stator and rotor shaft for relative rotation. Each end frame usually carries a lubricant reservoir surrounding the bearing which stores lubricant until it is gradually fed to the journal surfaces of the shaft by a wick or other suitable means. The reservoirs are sufficiently large to accommodate a supply of lubricant lasting for several years but the supply is hardly ever adequate for the operative life of the motor. Thus, it is necessary to provide means at each reservoir for the periodic addition of lubricant. Further, these motors are employed in a number of applications in which the same motor must be capable of use mounted in many different positions. That is to say, the motor may have its shaft axis varying, for any given support, all the way from the horizontal to the vertical, a so-called "all angle" mounted motor.

This has raised a practical difficulty in actual practice in providing a lubricant supplying arrangement to the reservoirs for both end frames which not only is inexpensive to produce and install, but also may be used regardless of the angle at which the motor is finally supported. The problem of adding lubricant is greatly magnified when the motor is supported vertically in equipment, with one end frame being positioned in a relatively inaccessible location, such as in domestic washing machines or industrial blowers, where it is literally impossible to add lubricant to that end frame without dismantling the motor from its support for that purpose.

It is therefore desirable to provide a dynamoelectric machine with an improved yet inexpensive and easily installed arrangement permitting the periodic addition of lubricant to the spaced apart lubricant reservoirs incorporated in the machine. It is further desirable that such arrangement be capable for use for all angles of machine mounting as well as for applications in which one of the reservoirs or end of the machine is disposed in a relatively inaccessible location.

Accordingly, it is a general object of the present invention to provide a dynamoelectric machine with an improved arrangement for admitting lubricant from time to time to the lubricant reservoirs of the machine, and it is a more specific object of the invention to provide such arrangement which includes the desirable features mentioned above.

It is another object of the invention to provide an improved arrangement for the periodic addition of lubricant to the lubricant storing reservoirs involving few parts which are low in cost to manufacture, can be quickly and easily installed, and furnishes a common location for supplying lubricant to more than one reservoir.

In carrying out the invention in one form, I provide an improved arrangement for admitting lubricant from a common location to a pair of lubricant retaining reservoirs carried by separated end frames of a dynamoelectric machine in which each end frame has a passageway communicating between an associated reservoir and the exterior of the machine housing. On the outer end of one of these passageways, I mount a single-piece lubricant fitting formed of molded material having a body section provided with two separated passages therethrough with one of the passages being somewhat L-shaped in the longitudinal direction. The respective entrances for the passages are located at a common surface of the body section and a cover section, integrally joined to a side surface of the body section by a flexible strip, is formed with two plugs adapted to be received within the passage entrances in complementing relation to effect a tight seal therewith. The ends of the passages remote from the common surface each terminate in substantially similar tubular extensions, with the extension for the L-shaped passage projecting angularly away from the other extension at approximately 90°. One extension is mounted to the outer end of one of the end frame passageways while conduit means connects the other extension to the outer end of the other end frame passageway.

With the foregoing construction, each of the extensions is capable of attachment to the outer end of either of the end frame passageways or to the connection means thereby permitting the use of the same fitting on the machine, regardless of the angle at which the axis of the machine is to be supported. In addition, the lubricant fitting itself is easily installed, relatively inexpensive to produce, and provides a common location for resupplying lubricant to both reservoirs at either end frame. This latter feature allows ready access for this purpose, even though the motor is mounted in a relatively inaccessible location in the equipment in which it is used with only one end frame being exposed. These as well as further features and advantages will become more apparent as the description proceeds.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a side view, partially cut away and partially in section, of the upper half of a dynamoelectric machine having its axis of rotation arranged horizontal and embodying the preferred form of the present invention;

FIG. 2 is an enlarged view in perspective, of the lubricant admitting fitting carried by the left end frame of the machine seen in FIG. 1; and FIG. 3 is a side view, partially cut away and partially in section of a portion of the machine shown in FIG. 1, illustrating the left end frame mounted with the axis of rotation disposed vertically and with the fitting of FIG. 2 carried by the end frame for this mounting.

Turning now to the drawing in more detail, by way of exemplification, the preferred embodiment of my invention is illustrated in connection with a small horsepower alternating current, single shaft extension, dynamoelectric machine 10. A conventional stator 11 of circular configuration is mounted within a central shell 12 which may be formed of suitable sheet material, such as steel. End frame assemblies 14 and 15 are arranged at the respective ends of shell 12 and secured thereto by a standard rabbet connection 16 and a number of through-bolts (not shown). These end frames each mount a common sleeve type bearing 17 which serves to journal a shaft 18 which in turn carries a rotor (not seen) for relative rotation. As illustrated, the support is accomplished by a standard spider and hub structure, generally indicated by numeral 21, formed integral with wall 22 of the end frames.

Besides supporting a bearing, the end frames are formed with axial extensions 23, 24 which respectively carry generally cup-shaped outer and inner cap members 25, 26. These members each have a flanged type friction fit with the extensions and along with the extensions, provide cavities for accommodating lubricant absorbent material, such as pads of felt generally indicated at 28, which form lubricant reservoirs surrounding the bearings and are impregnated with a suitable grade of lubricating oil. A wick 29, extending from pads 28 through a central window in bearing 17 and an aligned opening in hub structure 21, into contact with shaft 18, controls the capillary flow of lubricant from the reservoir to the shaft in the well-known way for lubricating purposes.

By an important feature of the present invention, the machine of the exemplification is provided with an inexpensive arrangement which not only provides a simple way for supplying lubricant to both reservoirs from a common location, but also permits a satisfactory addition of lubricant to each reservoir regardless of the angle at which the machine shaft is finally disposed. In the illustrated machine, each end frame wall 22 is furnished with a generally radial passageway 31 extending from peripheral surface 32 of the end frame beyond the confines of the machine housing to the reservoir. A fitting, denoted generally by the numeral 35 in the drawing, is mounted to the upper end (as viewed in the drawing) of one of the passageways and is connected by a tube 33 and elbow 34 to the upper end of the passageway 31 of the other end frame for admitting lubricant to both reservoirs. As shown, fitting 35 is of a molded one-piece construction, formed of suitable, relatively hard yet slightly resilient material; e.g., thermo-responsive plastic such as nylon. The fitting has a body section best seen in FIG. 2 which is generally oval in cross-section configuration with its upper surface being planar as indicated at 36. Along the longitudinal axis of this surface are provided two entrances 37 and 38 in spaced relation respectively for passages 41 and 42 which project entirely through the body section and terminate in diverse directions.

More specifically, the longitudinal axis of passage 41 is generally perpendicular to planar surface 36, terminating at the end remote from entrance 37 in a tubular extension 43 of a predetermined cross-section which depends beyond the bottom surface of that section. The other passage 42 is generally L-shaped in its longitudinal direction, with its leg remote from entrance 38 projecting somewhat perpendicularly away from passage 41 to terminate beyond a side surface of the body section in a tubular extension 44. This extension is preferably substantially identical in configuration to extension 43, with the extensions being angularly displaced from each other by approximately 90°.

With the aforedescribed construction, it will be appreciated that either tubular extension 43 or 44 of fitting 35 is capable of being inserted into the upper end of passageway 31 for mounting the fitting onto the chosen end frame in the desired manner. For instance, if the machine is to be installed with its shaft axis horizontal (FIG. 1), then extension 43 for straight passage 41 may be mounted onto the end frame. This may be achieved by a force fit between the outer surface of extension 43 and the inner surface of passageway 31 at its upper end. To assemble fitting 35 onto the end frame, extension 43 may be inserted into passageway 31 and forced downward by suitable downward tapping on planar surface 36 of the fitting, as by hammer blows, without deleteriously affecting the quality of the fitting. If desired, an annular shoulder 45 may be formed at the integral connection between the extension and the body section to furnish an abutment with surface 32 of the end frame to provide a suitable stop and seal at that location. The other extension 44 for the L-shaped passage 42 has a shoulder 46 surrounding it in the manner already explained in connection with extension 43. Further, extension 44 may be readily inserted within the end of tube 33 to produce a tight fit. The tube may be conventionally fabricated of flexible material; e.g., suitable thermoresponsive plastic, such as a vinyl product, to facilitate its assembly with the extension.

Still referring to FIG. 1, it will be seen that entrance 37 will be in direct communication with the left reservoir (as viewed in the drawing) and entrance 38 provides access, through tubing 33, L-shaped passageway 48, and finally end frame passageway 31 of the end frame remote from the fitting, to the right reservoir. Consequently, lubricant may be independently supplied to each reservoir from a common location. In addition, common surface 36 and entrances 37, 38 will face upward, preventing the escape of residual lubricant from the reservoirs while providing ready access to the two reservoirs which corresponds to the location generally provided for re-oiling purposes in the equipment in which the machine is to be mounted. Moreover, with the entrances 37, 38 facing upward, gravity feed may conveniently be utilized for supplying lubricant to the reservoirs.

For those situations requiring a machine mounted with the shaft disposed vertically in the manner illustrated by FIG. 3, fitting 35 is capable of achieving the same advantages and benefits previously mentioned in connection with the horizontal mount of FIG. 1. However, in its finally assembled position on the machine for the vertical mount of FIG. 3, the tubular extensions have a reverse relation to passageway 31 and tube 33. That is to say, the L-shaped passage 42 of the fitting is in direct communication with passageway 31 and the reservoir of the end frame carrying the fitting while the straight passage 41 communicates with the other reservoir through tube 33 and elbow 34. For machine mounting angles between those shown in FIGS. 1 and 3, it will be appreciated that entrances 37, 38 are capable of being directed upwardly in the desired direction at an angle never exceeding 45° from the optimum illustrated upward direction.

It should be noted at this time from FIG. 1 that an L-shaped passage 48 of elbow 34 preferably terminates at each end in a tubular extension 47, identical in construction with extensions 43, 44. In addition, like fitting 35 but in a reverse fashion, elbow 34 has one of the extensions mounted to the upper end of passageway 31 of its associated end frame and the other end frictionally accommodated in the end of tube 33 remote from the fitting. Thus, the fitting and elbow are interchangeable in position, providing versatility in utilization of the arrangement. For purposes of assembly, the outer surface of elbow 34 may include a flat portion 49 adjacent the apex of passage 48 which is adapted to receive an impact type blow from a hammer or the like as extension 47 is being force fitted into the upper end of the passageway 31.

For closing the passages and preventing dust and other foreign particles from entering into the rservoirs, a flat cover section 51 having the same general oval contour as that of surface 36 is hinged to one of the longitudinal sides of the body section by means of an elongated flexible strip 52 molded integral on one edge of the cover. The under side of the cover carries a pair of generally frusto-conical shaped solid projections or plugs 53, 54 for entering entrances 37, 38 respectively to provide a tight or friction sealing fit therewith. To this end, the entrances preferably have a frusto-conical cross-section complementing the outer sides of the projections. On the edge of cover section 51, opposite to the one connected to strip 52, is a lateral tab 55 which projects beyond surface 36 when the cover is in the closed position (FIGS. 1 and 3). The tab may be used to facilitate lifting the cover away from surface 36 when it is desired to open the passages for the introduction of lubricant to the reservoirs.

The inherent resiliency of strip 52 in its elongated form tends to urge the cover, with its projections 53, 54, away from surface 36 in the manner shown in FIG. 2 once the projections have been removed from passages 37, 38. This allows unimpeded access to entrances 37 and 38 without interference from the cover during the addition of lubricant from an oil can or any other suitable source of lubricant.

It will now be readily apparent from the foregoing description of the illustrated embodiment that I have provided a dynamoelectric machine with an improved yet inexpensive and easily installed arrangement which permits the periodic addition of lubricant to spaced apart reservoirs, regardless of the angle at which the machine is ultimately mounted. This arrangement includes relatively few component parts which are low in cost to manufacture and can be quickly and easily installed without the use of skilled labor. Moreover, the present invention permits a satisfactory and, if desired, independent supply of lubricant from a common location to several reservoirs even though the machine is disposed at a relatively inaccessible location.

While in accordance with the patent statutes, I have described what at present is considered to be the preferred embodiment of my invention, it will be obvious to those skilled in the art that numerous changes and modifications may be made therein without departing from the invention and it is therefore aimed in the appended claim to cover all such equivalent variations as fall within the true spirit and scope of the invention.

What I claim as new and desire to secure by Letters Patent of the United States is:

1. A dynamoelectric machine including a housing having a pair of end frames for rotatably supporting a shaft at spaced apart locations, a lubricant reservoir carried by each end frame for storing lubricant, first passageway means located within a first of said end frames and communicating between the exterior of the housing and one reservoir, a single lubricant fitting for admitting lubricant to both reservoirs from a common location mounted to said means, said fitting comprising a body section having first and second separated passages therethrough, said passages each including an entrance at an outer surface of said body section, cover means for closing the passages at said outer surface, the termination of said passages remote from said entrances being disposed in angularly spaced apart relation, means for mounting one of said terminations on the outer end of said first passageway means, and second passageway means having at least a portion within the other of said end frames and connecting the other passage termination of said fitting to the other reservoir, said terminations each being capable of connection with either the first or second passageway means thereby permitting the use of the same fitting for all-angle support of the machine.

2. A dynamoelectric machine including a housing having a pair of end frames for rotatably supporting a shaft at spaced apart locations, a lubricant reservoir carried by each end frame for storing lubricant, a passageway within each end frame communicating between the exterior of the housing and the reservoir of each end frame, a lubricant fitting for admitting lubricant to both reservoirs mounted to one of said passageways, said fitting comprising a body section having first and second separated passages therethrough, cover means removably attached to said body section for closing the respective passages at one end thereof, the ends of said respective passages remote from said one end terminating in tubular extensions, the extension for said second passage projecting away from said first passage in angularly spaced relation to said first passage extension, one of said extensions being mounted at the outer end of said one passageway, means for connecting the other extension of said fitting to the outer end of the other of said end frame passageways, each of said extensions being capable of attachment to the outer end of an end frame passageway and to the connecting means thereby permitting the use of the same fitting for all-angle support of the machine.

3. A dynamoelectric machine including a housing having a pair of end frames for rotatably supporting a shaft at spaced apart locations, a lubricant reservoir carried by each end frame for storing lubricant, a passageway communicating between the exterior of the housing and each reservoir, a single-piece lubricant fitting for admitting lubricant to both reservoirs from a common location, said fitting being formed of molded material comprising a body section having first and second separated passages therethrough, said passages each including an entrance at a common surface of said body section, and terminating in angularly spaced apart ends, a cover section movably attached to said body section for closing the entrances of said passages at said common surface, said cover section having a pair of integrally formed plugs on one surface thereof in complementing relation to said entrances for insertion therein, a flexible elongated strip formed integral with both said cover and body sections joining said sections together for relative movement, means arranged at the end of said first passage remote from its entrance for mounting said fitting onto one of said end frames with said first passage and the passageway of said one end frame being in open communication, and means connecting the end of said second passage remote from its entrance to the passageway of the other end frame whereby lubricant may be added independently to the respective reservoirs from a common location.

4. A dynamoelectric machine including a housing having a pair of end frames for rotatably supporting a shaft at spaced apart locations, a lubricant reservoir carried by each end frame for storing lubricant, a passageway communicating between the exterior of the housing and each reservoir, a single-piece lubricant fitting for admitting lubricant to both reservoirs from a common location, said fitting being formed of molded material comprising a body section having first and second separated passages therethrough with said second passage being generally L-shaped, said passages each including an entrance at a common surface of said body section, cover means movably attached to said body section for effecting a tight closure of the passages at said common surface, the ends of said passages remote from said common surface terminating in tubular extensions, the extension for said first passage being formed on the surface of said body section opposite from said common surface, the extension for said second passage projecting away from said first passage in angularly spaced relation to said first passage extension, one of said extensions being mounted at the outer end of one of said end frame passageways, means connecting the other extension to the outer end of the other passageway, each of said extensions being capable of attachment to the outer end of the end frame passageway or to the connection means thereby permitting the use of the same fitting for all-angle support of the machine.

5. For use in a dynamoelectric machine housing having at least one end frame carrying a lubricant reservoir and a passageway communicating between the exterior of the housing and the reservoir, a single-piece lubricant fitting formed of molded material comprising a body section having first and second passages therethrough with said second passage being generally curved, said passages having an entrance at one surface of said body section, the ends of said passages remote from said entrances terminating in tubular extensions, the extension for said first passage being formed on a surface of said body section in opposed relation to said one surface, the extension for said curved passage projecting away from said first passage in angularly spaced relation to said first passage extenson, at least one of said extensions being adapted for connection with the passageway of the end frame, and cover means removably mounted to said body section for effecting a tight closure of the passages to prevent the entrance of dust and other foreign matter, the cover means including a pair of elongate plug means extending from one face of the cover means, and flexible resilient fastening means for joining said cover means to said body section.

6. For use in a dynamoelectric machine housing having at least one end frame carrying a lubricant reservoir and a passageway communicating between the exterior of the housing and the reservoir, a single-piece lubricant fitting formed of molded material comprising a body section having first and second separated elongated passages therethrough, said passages each including an entrance at a common planar surface of said body section, the respective ends of said passages remote from said entrances terminating in substantially similar tubular extensions, the extension for said first passage being formed on a surface of said body section in opposed relation to said common planar surface, the extension for said second passage projecting away from said first passage in angularly spaced relation to said first passage extension, said extensions each being adapted for connection with the passageway of the end frame whereby said fitting may be mounted in first or second positions on said machine housing, and a cover section integrally provided with a pair of separated plugs on one surface thereof in complementing relation to said entrances for insertion therein to effect a tight closure of the passages, said cover being movably attached to said body section by a flexible elongated strip formed integral with both said cover and body sections.

References Cited by the Examiner

UNITED STATES PATENTS

| | | | |
|---|---|---|---|
| 428,740 | 5/1890 | Almond | 308—124 X |
| 652,089 | 6/1900 | Dangler | 184—65 X |
| 1,324,869 | 12/1919 | Wolfermann. | |
| 2,599,472 | 6/1952 | Miller. | |
| 2,892,465 | 6/1959 | Lyle | 285—131 X |

LAVERNE D. GEIGER, *Primary Examiner.*

E. J. EARLS, *Assistant Examiner.*